US006424384B1

(12) United States Patent
Tsyrganovich (10) Patent No.: US 6,424,384 B1
(45) Date of Patent: Jul. 23, 2002

(54) METHOD AND APPARATUS FOR IMPROVED SIGNAL FILTERING

(75) Inventor: Anatoliy V. Tsyrganovich, San Jose, CA (US)

(73) Assignee: Zilog, Inc., Campbell, CA (US)

( * ) Notice: Subject to any disclaimer, the term of this patent is extended or adjusted under 35 U.S.C. 154(b) by 0 days.

(21) Appl. No.: 09/359,259

(22) Filed: Jul. 22, 1999

(51) Int. Cl.$^7$ ................................................. H04N 9/78
(52) U.S. Cl. ...................................... 348/666; 348/665
(58) Field of Search ................................. 348/663–670, 348/607, 624, 618, 615, 908; H04N 9/78

(56) References Cited

U.S. PATENT DOCUMENTS

| | | | | |
|---|---|---|---|---|
| 4,466,016 A | * | 8/1984 | Pritchard | 358/31 |
| 4,641,186 A | * | 2/1987 | Pritchard | 358/105 |
| 4,809,060 A | * | 2/1989 | Saeki | 358/31 |
| 4,814,863 A | | 3/1989 | Topper et al. | |
| 4,833,526 A | * | 5/1989 | Topper | 358/21 |
| 4,949,166 A | * | 8/1990 | Isnardi | 358/12 |
| 4,994,906 A | * | 2/1991 | Moriwake | 358/31 |
| 5,003,389 A | * | 3/1991 | Isobe et al. | 358/141 |
| 5,032,914 A | * | 7/1991 | Fujita | 358/105 |
| 5,150,202 A | * | 9/1992 | Ledinh et al. | 358/31 |
| 5,155,582 A | | 10/1992 | Tokoi et al. | |
| 5,258,838 A | | 11/1993 | Citta | |
| 5,285,266 A | * | 2/1994 | Jo | 348/665 |
| 5,594,508 A | | 1/1997 | Penney | |

FOREIGN PATENT DOCUMENTS

WO 9310641 5/1993

OTHER PUBLICATIONS

"Video: Tech Basics," June 1985, http://www.eclipse.net/~slepian/Tch.html, 4 pages.

Bradford, Steven, "A Simplified Guide to the NTSC Video Signal," 1995, 5 pages.

Greg Rogers, "Guide to Comb Filters: Y/C Separation," Cyber Theater™, The Internet Journal of Home Theater, http://www.cybertheater.com/ Tech$_{13}$Reports/Comb$_{13}$Filter$_{13}$Tut/guide$_{13}$comb$_{13}$filters.html, 15 pages.

Greg Rogers, "Video Signal Formats," 1996, Cyber Theater™, The Internet Journal of Home Theater http://www.cybertheater.com/ Tech$_{13}$Archive/YC$_{13}$Comp$_{13}$Format/yc$_{13}$comp$_{13}$format.html, 7 pages.

Steve Mullen, "Video Technology Explained," 1999, 5 pages.

"Project Diva: DVD Premastering Processes For SMEs In the Audio visual Sector," 21 pages.

"Digital Filter Techniques Using the 80C196", Intel Corporation, 1999, 9 pages.

Bradley, R. and Barnbaum, C. "A New Method to Cancel RFI—The Adaptive Filter," http://www.aas.org/publications/baas/v28n4/aas189/abs/S107004.html, Session 107—Radio Astronomy and VLBI Instruments Display Session, Jan. 16, 1999, Metropolitan Ballroom, 1 page.

Landen, Hal, "Engineering Primer," http://www.videouniversity.com/engineer.htm. Video Engineering Primer, Oak Tree Press, 5 pages.

* cited by examiner

Primary Examiner—Victor R. Kostak
(74) Attorney, Agent, or Firm—Skjerven Morrill MacPherson LLP (57) ABSTRACT

A method and apparatus for separating a signal uses a low pass filtering in a first direction to produce a signal with a low component and a alias component and then uses a filtering in a second direction to produce a component of a separated signal. The filter has applications in television signal decoding and has other applications.

27 Claims, 8 Drawing Sheets

METHOD AND APPARATUS FOR IMPROVED SIGNAL FILTERING

FIELD OF THE INVENTION

This invention relates to the field of signal processing. More particularly, the present invention relates to methods and apparatus for signal filtering.

BACKGROUND OF THE INVENTION

One task that often is performed in signal processing is the removal of a portion of a signal, based on the specific characteristics of that portion of the signal. An analog or digital signal processing device or method that performs this function is often referred to in the art as a filter.

Another function that can be performed by a filter is signal separation. Often a filter is employed to remove a part of a signal and output one component of the signal and then that first output component is subtracted from the original signal to produce an additional separated component.

One application for signal filtering and signal separation is decoding a composite color television signal. As is known in the art, several common television encoding standards (such as NTSC), encode color television signals into two principal components, Y (luminance) and C (chrominance) and combine these two components into a composite video signal. For broadcast, this signal is then applied to an RF carrier frequency. The luminance component carries the primary gray-level information and is suitable for display on a black and white television. The chrominance component carries color difference information and is decoded and combined with the Y component to produce RGB control signals for RGB color television reproduction.

A comb filter is one type of advanced filter used to separate a composite signal into Y and C components, while maintaining bandwidth. A comb filter is ideal for composite signal with no signal variations in vertical direction as well as for signal of a transmitted still picture. It does not affect resolution in horizontal direction.

U.S. Pat. No. 5,155,582, entitled DOT CRAWLING INTERFERENCE ELIMINATION DEVICE AND COLOR SUBCARRIER VERTICAL CORRELATION DETECTION DEVICE, issued Oct. 13, 1992, discusses a number of problems and issues related to decoding composite television signals:

There are various problems occurring in a television receiver, such as dot crawling interference and cross color interference which occur due to multiplexing of the frequency of a color signal with the frequency of a luminance signal, line flicker which occurs due to interlace scanning, and deterioration of picture quality which occurs due to reduction in vertical resolution, etc. In order to solve these problems, frame memories and digital signal processing techniques have been used in recent years, thereby to improve the quality of the picture in a television receiver. These methods introduce processing techniques such as a three-dimensional Y/C separation which utilizes correlation of time directions of video signals and a sequential scanning converter.

The '582 patent discusses a dot crawling interference elimination device with a means for detecting a vertical correlation from the sum of interline color subcarrier of an input video signal, and a notch filter for eliminating dot crawling interference from a luminance signal resulting from a Y/C separation of the input signal, in accordance with an output of said detecting means. The color subcarrier vertical correlation detection device includes means for detecting vertical correlation of a color burst signal of an input video signal and means for discriminating a non-standard state of the input video signal on the basis of an output of the detecting. The discussed circuit of the patent is directed to detecting a vertical correlation of a color subcarrier of a non-standard signal and applies a notch filter to a luminance signal resulting from a Y/C separation in accordance with a result of the detection, so that a satisfactory luminance signal having suppressed dot crawling interference can be obtained.

U.S. Pat. No. 5,594,508 discusses several preset filters that can be changed or switched based on a correlation analysis.

U.S. Pat. No. 4,814,863 discusses switching comb and notch filters using artifact analysis criteria.

Publication WO 93/10641 describes nonlinear signal processing wherein a color envelope signal is obtained to control subtraction of chroma signal for a composite signal.

*Video Technology Explained*, by Steve Mullen (1999), reviews a number of relevant background issues regarding digital sampling time base correction, luminance noise reduction, chroma noise reduction, field memory noise reduction, color bleed reduction, luminance delay adjustment and Y/C separation.

*Guide to Comb Filters*: Y/C Separation, by Greg Rogers (http://www.cybertheater.com/ Tech_Reports/Comb_Filter_Tut/guide_comb_filters.html reviews background concepts related to Y/C separation and comb filters.

While many different methods and systems for separating a composite signal have been proposed, less complex systems suffer from the artifacts and imperfections just described. Complex signal processing systems that can eliminate these artifacts, are generally too expensive to implement in many consumer video systems. What is needed is a relatively simple method or device that can separate a composite signal without unwanted artifacts.

SUMMARY OF THE INVENTION

The present invention in various embodiments encompasses a method or apparatus for improved signal filtering. According to the invention, an information signal is processed by a 2D (two-dimensional) filtering system designed so that in several consecutive steps a desired separated signal is obtained. In one embodiment, the invention is a method for using a low pass filter architecture to filter composite TV signal in a vertical direction to produce a low pass filter output that contains a low frequency component and an alias higher frequency component. A filter in a horizontal direction is then used to generate a desired luminance or chrominance signal.

The invention has particular applications in generating a luminance component signal from a composite color television signal and also may have other applications.

Among other benefits, the present invention reduces unwanted interference of a luminance and a chrominance television signals when vertical/diagonal lines occur. Consecutive filtering eliminates possibility of the vertical lines spectrum being demodulated as a color signal and thereby degrading displayed image quality.

It is known in the art that signal processing may be accomplished by analog circuits, by digital circuits, or by logic processes executed on computing devices, and specific embodiments of the present invention encompass each of the various ways known in the art for signal processing. Terms such as "a filter" "an adder" "a multiplier", etc., may be understood in the art as referring to either an analog circuit device or part thereof, a digital circuit device or part thereof, or a logical process or operation in a general purpose computer system or a special-purpose signal processing system. When used in reference with the present invention or in the claims, it is intended that these terms may incorporate any of these meanings unless the context requires otherwise.

DESCRIPTION OF SPECIFIC EMBODIMENTS

Figure 1A:
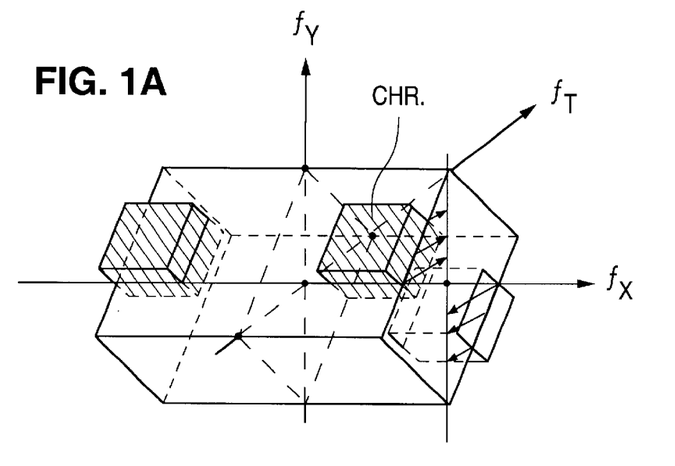
FIGS. 1A–C are illustrations showing a composite signal with chrominance components as known in the art.
Figure 1B:
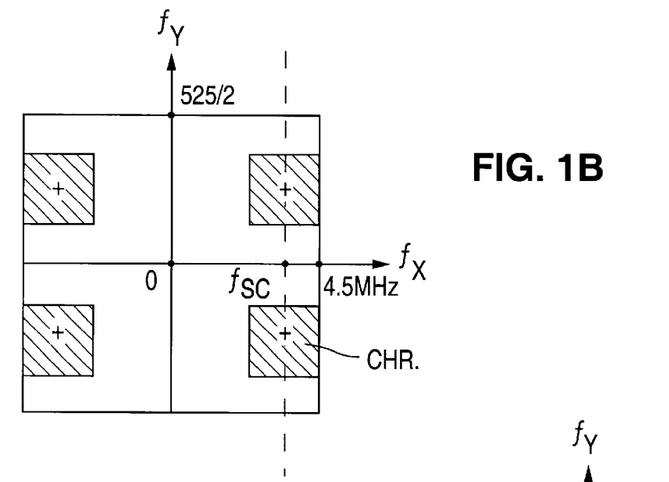
Figure 1C:
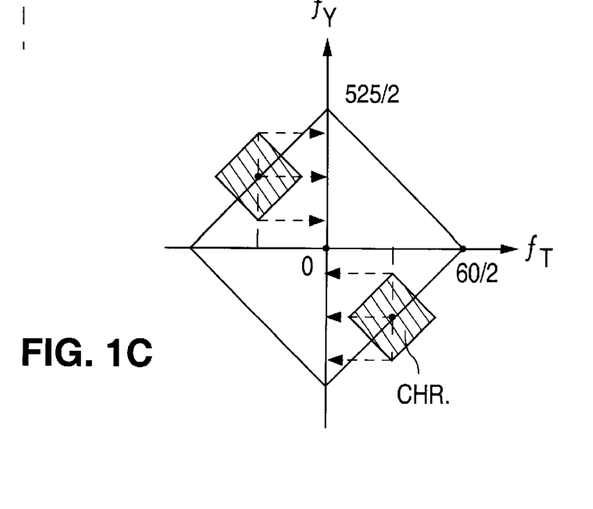

FIGS. 1A–C are diagrams showing the presence of chrominance signal components in a composite TV signal as known in the art. FIG. 1A is a 3d spectra representation of the composite signal in frequency space, plotted in coordinates fx, fy, and ft. The modulated Chrominance(C) component is represented by the solid shaded regions and the Y component is the remaining signal. FIG. 1B shows the same signal data as a 2D projection spatial spectrum, viewed in parallel to the ft axis. The chrominance subcarrier frequency (fsc) of approximately 3.58 MHz is indicated for a standard NTSC color composite signal and the total composite frequency bandwidth of 4.5 MHz in the same standard is shown. These values are specific examples only. The ratio 525/2 at the fy axis indicates vertical frequency in the standard number of interleaved horizontal scan lines per field. FIG. 1C shows the same signal data as a vertical-temporal spectrum, viewed in parallel to the fx axis. The ratio 60/2 at the ft axis indicates the frame scan rate of 30 interleaved frames per second.

Figure 2A:
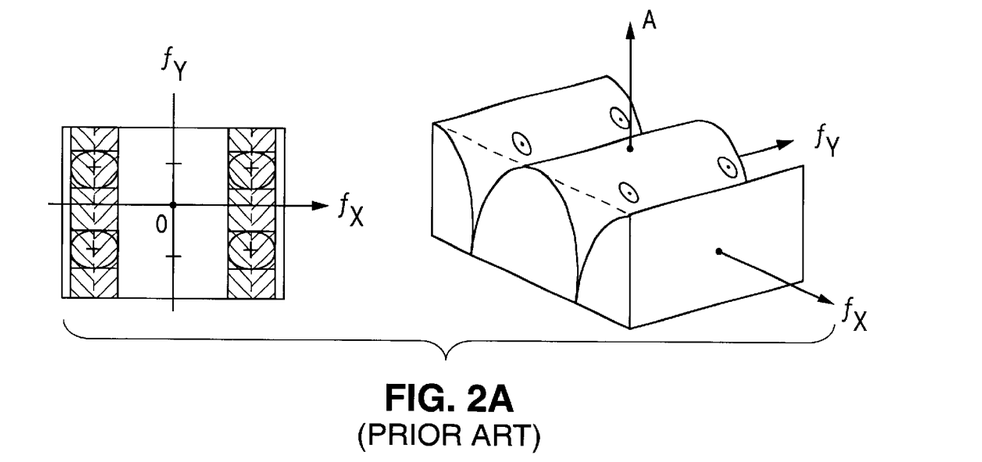
FIGS. 2A–B are illustrations of the operation of a notch filter and a comb filter as known in the art.
Figure 2B:
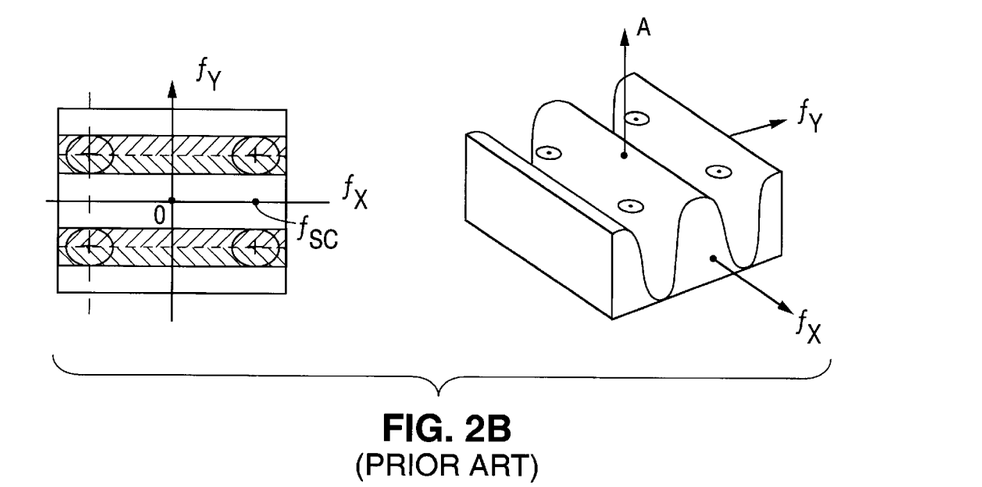

FIGS. 2A and 2B show the operation of simple notch and comb filters, as known in the art. As can be seen from the figures, and as is known in the art, both types of the filters can effectively remove the C signal from the composite, but both also remove portions of the signal that are Y signal. This can degrade the Y image. In addition, if the output C signal is generated by subtracting the decoded Y signal from the composite, either of these filters will add artifacts to the output C signal. It is known in the art to attempt to combine these two filters to produce a more ideal filter with filter adaptation and switching between notch and comb filters. These solutions are undesirable for some applications because of the cost and circuit or processing complexity required and because they can also introduce imperfections are artifacts of their own.

Figure 3:
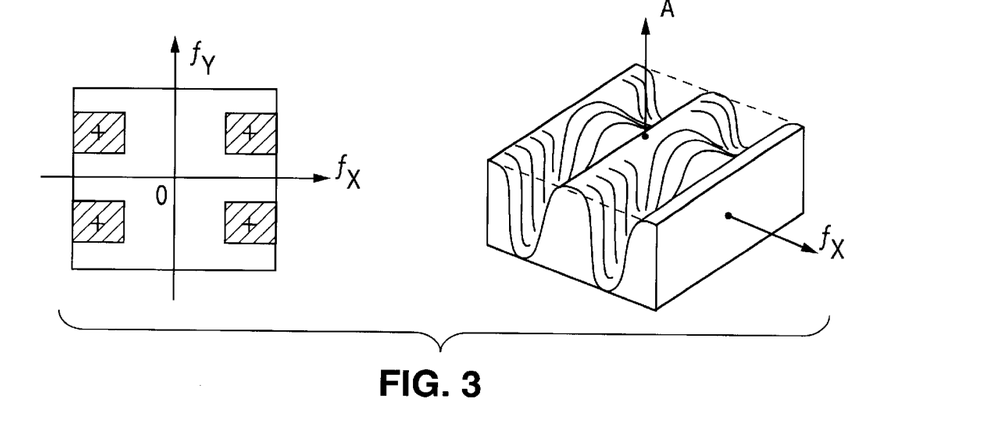
FIG. 3 is an illustration of a desired 2D filter characteristic for chronimance filtering of a composite signal.

FIG. 3 shows a representation of the frequency response of a desirable C filter, both in a 2D representation and in a 3D view with amplitude axis A added. A near-ideal filter using classical methods can be created with analog components, but the size and expense of the resultant circuit makes it impractical for home television decoding. A near-ideal filter can also be implemented in a classical digital signal processing (DSP) device, but doing so generally requires 20 or more multipliers, and this also results in too complex or large a circuit for most home television devices.

FIGS. 4A–D illustrate a method for performing a 2D filter function according to an embodiment of the invention. The complete spectrum signal is represented by the rectangle shown in each of the figures.

Figure 4A:
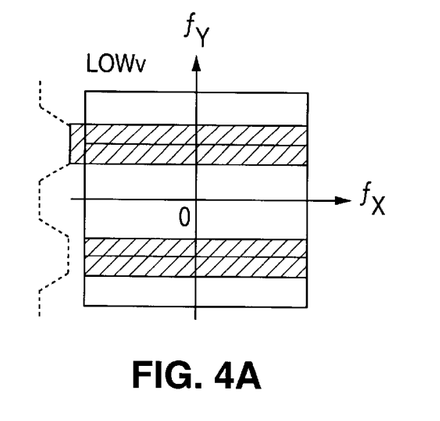
FIGS. 4A–D graphically illustrate a method for achieving the desired filtering according to an embodiment of the invention.
Figure 4B:
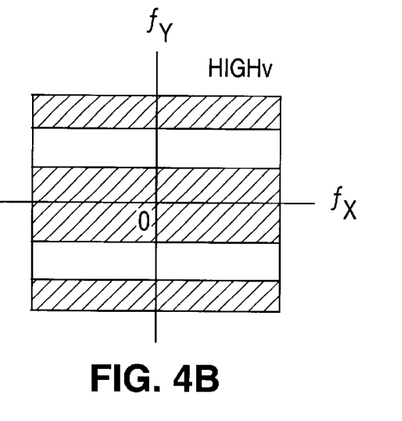
Figure 4C:
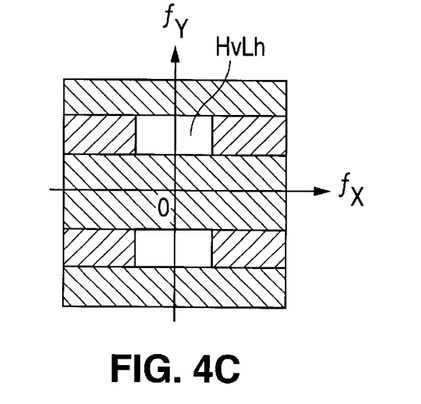
Figure 4D:
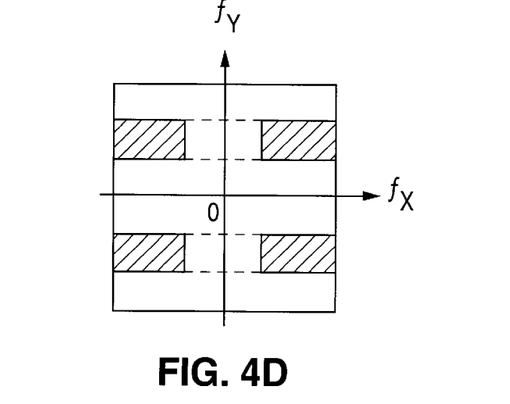

In 4A, a filter function is performed on the original signal, creating two deletion regions that are shown as the shaded regions. According to one embodiment of the invention, this filter function is performed by a low pass filter (LPF) operating on the vertical (Y) frequency direction, to produce a signal that may be referred to as LOWv. When applied to a signal such as an NTSC television signal, the LPF results in the filter response as shown.

As can be seen from FIG. 4A, the signal contains both the low frequency components and also contains a high frequency component due to aliasing. While the alias frequencies output by the LPF are generally considered to be unwanted results from the LPF filter, in the present invention the alias frequency response is used to capture the desired high frequency components of the composite signal.

In 4B, the LOWv signal from 4A is removed from the input composite signal, resulting in the complement of 4A, which is here referred to as HIGHv, though it does not necessarily include the highest frequency components because of the alias components of LOWv. This 4B signal is then processed with an LPF operating in the horizontal (X) frequency direction to produce the signal shown in 4C, which is here referred to as HIGHvLOWh (or HvLh). The signal from 4C is then combined with the signal from 4A, to produce the desired signal LUM, which includes all of the luminance frequencies and none of the chrominance signal component. The signal from 4D can then be removed from the input signal to produce the chrominance signal CHROM.

Figure 5:
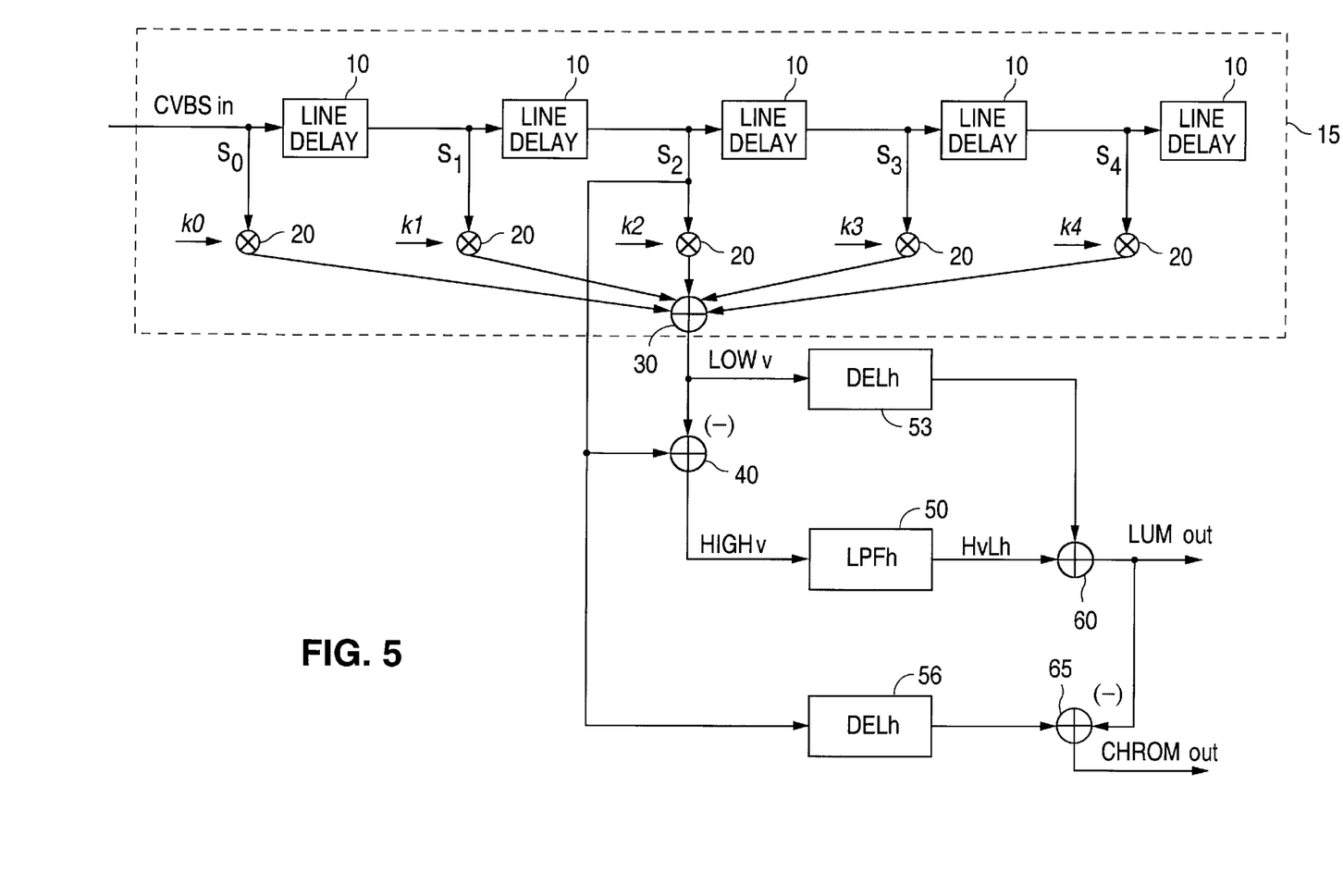
FIG. 5 is a block diagram of a circuit or logic process for performing filtering according to an embodiment of the invention.

FIG. 5 is a block diagram of one 2D filter according to an embodiment of the invention. In particular applications with appropriate coefficients and delay values, this filter can produce the signal processing as shown in FIG. 4. The general filter structure shown in FIG. 5 may be implemented as either an analog filter operating on an analog CVBSin, a digital filter operating on a digital CVBSin or a combination analog/digital circuit including analog/digital converters where necessary in the filter structure. Other apparatus and method implementations of FIG. 4 are possible, as discussed below. FIG. 4 may also be produced using logic functions in a digital signal processing system.

In FIG. 5, CVBS-in (Composite Video Baseband Signal) enters a Finite Impulse Response (FIR) Low Pass Filter Structure designated as 15. Various FIR LPFs are known in the art and can be used in the present invention. The example structure of FIG. 5 is comprised of a series of line delay elements 10. Delay elements 10 cause a one scan line delay (sometimes referred to in the art as a 1H delay for one horizontal scan line) between their inputs and outputs, resulting in five aligned scan-line signals $S_0$, $S_1$, $S_2$, $S_3$, and $S_4$. It is known that the total number of delay elements and aligned scan lines may vary in different specific implementations.

In the diagram shown in FIG. 5, $S_2$ is the center scan line signal. It is essentially this signal that is separated into Y and C components and becomes outputs LUM out and CHROM out. Thus, LUM out and CHROM out are delayed two scan lines from the input CVBS signal, plus an additional delay caused by LPFh 50, adders and multipliers, and aligning delays 53 and 56.

As can be seen in FIG. 5, $S_{0-4}$ are multiplied by coefficients $k_0$ through $k_4$ and then are combined in 30 to produce LOWv $k_{0-4}$ are coefficients used to create a low-pass filter (LPF) as is known in the art. These coefficients may vary in different specific applications. Some typical values for the coefficients are −0.03125, 0.25, 0.5625, 0.25, −0.03125, respectively.

LOWv represents frequency component of the vertical composite signal after filtering by the LPF structure. This signal results in part in this specific embodiment from the combining performed by 30 because of the NTSC encoding of C and Y information, wherein C component information is inversely encoded in each interleaved frame, furthermore the encoding process places fsc in the middle of the vertical spatial frequency for NTSC.

LOWv is subtracted from center signal $S_2$ by adder 40 to produce signal HIGHv, which represents the complementary or high frequency component of the composite signal in the vertical direction. It contains chrominance signal spectrum and some of the luminance spectrum.

HIGHv, according to an embodiment of the invention, is then processed by LPFh (Low Pass Filter Horizontal) 50, which is applied in the horizontal direction, to produce a signal labeled HvLh (HIGHvLOWh). This signal no longer contains chrominance information. HvLh is then combined with LOWv (which has passed through an aligning delay 53) to result in the signal LUM out. As a result of the operation of the invention, this signal is very close to the desired luminance signal shown in FIG. 4D.

LUM out may then be subtracted from center signal $S_2$ (which has passed through an aligning delay 56) by 65 to produce signal CHROM out. As a result of the operation of the invention, this signal is close to the desired chrominance signal shown in FIG. 4D.

Figure 6:
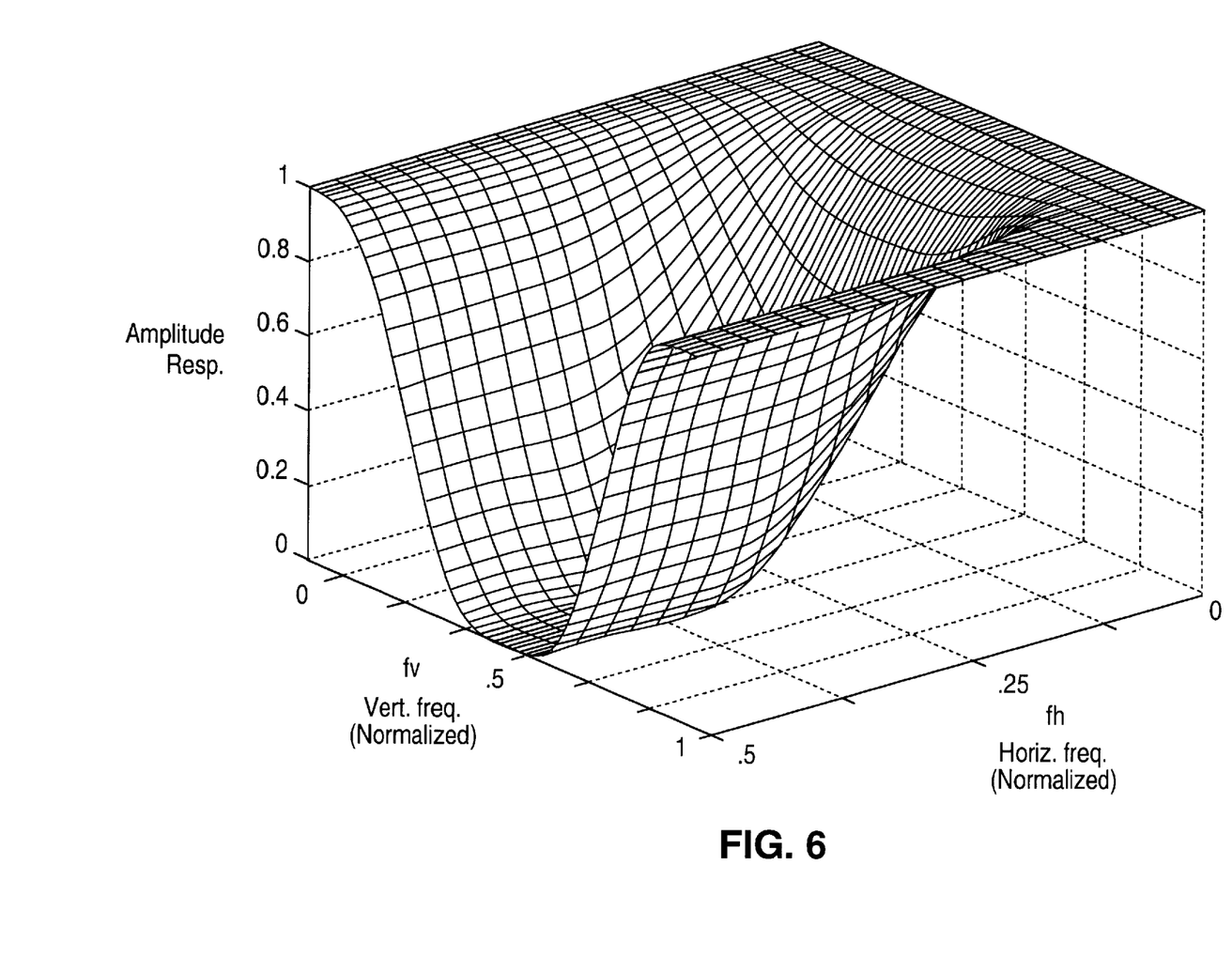
FIG. 6 is a plot showing the impulse response of a quadrant in a specific example of the circuit or process shown in FIG. 5.

FIG. 6 is a plot showing an example impulse response for one specific example of the circuit or process shown in FIG. 5 as determined from a simulation. This plot corresponds to the left bottom corner of FIG. 4D. As can be seen in the figure, the circuit provides approximately unity gain at all frequencies except for a central area at fV at 0.5 and fH between 0.5 and 0.25.

Alternate HvHh Embodiment

Figure 7A:
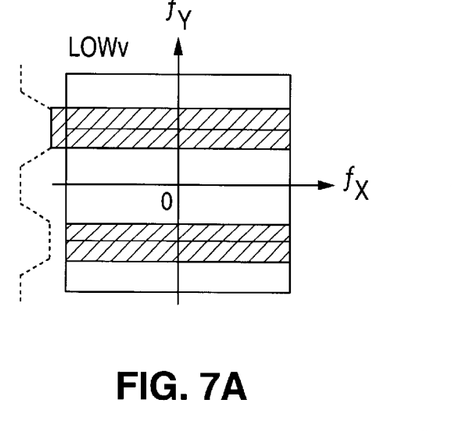
FIGS. 7A–7D graphically illustrate a method for achieving the desired filtering according to an embodiment of the invention.
Figure 7B:
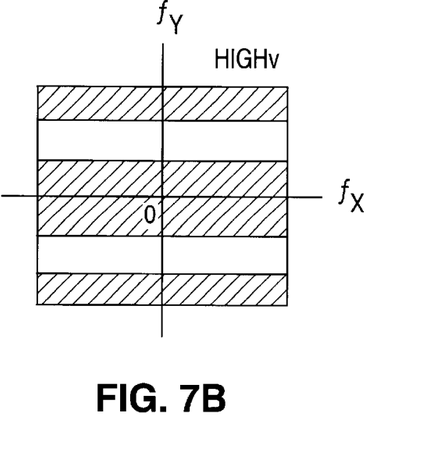
Figure 7C:
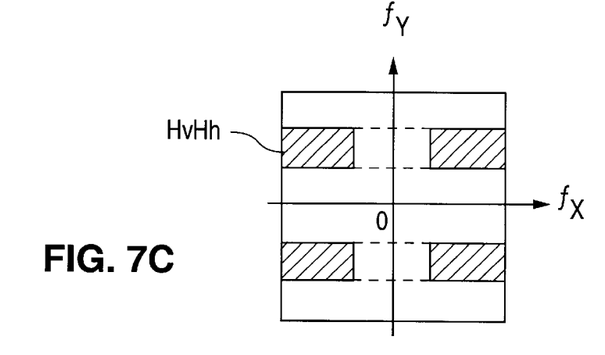

FIGS. 7A–C illustrate a method for performing a 2D filter function according to an alternate embodiment of the invention. The complete spectrum signal is represented by the rectangle shown in each of the figures.

Figure 7D:
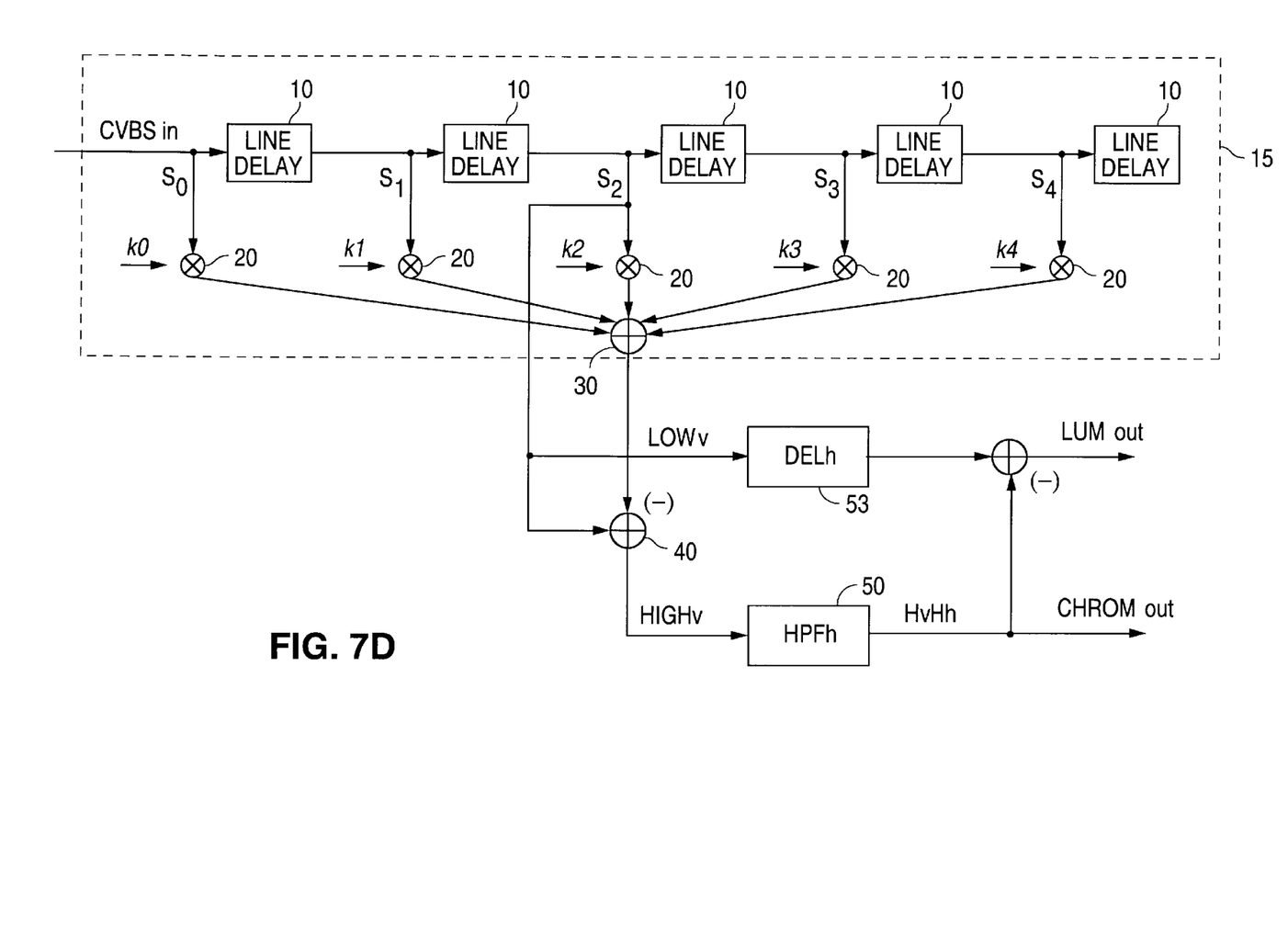

In FIG. 7D, a filter function is performed on the original signal, creating two deletion regions that are shown as shaded regions. According to one embodiment of the invention, this filter function is performed by a low pass filter (LPF) operating on the vertical (Y) frequency direction, to produce a signal that may be referred to as LOWv. When applied to a signal such as an NTSC television signal, the LPF results in the filter response as shown in FIG. 7A.

As can be seen from FIG. 7A, the signal contains both the low frequency components and also contains a high frequency component due to aliasing. While the alias frequencies output by the LPF are generally considered to be unwanted results from the LPF filter, in the present invention the alias frequency response is used to capture the desired high frequency components of the composite signal.

In 7B, the complement of 7A is produced, which is here referred to as HIGHV, though it does not necessarily include the highest frequency components because of the alias components of LOWv. This 7B signal is then filtered with an High Pass Filter (HPF) operating in the horizontal (X) frequency direction to produce the signal shown in 7C, which is here referred to as HIGHvHIGHh (or HvLh). The 7C signal contains the desired components of the chrominance signal CHROM.

Figure 8:
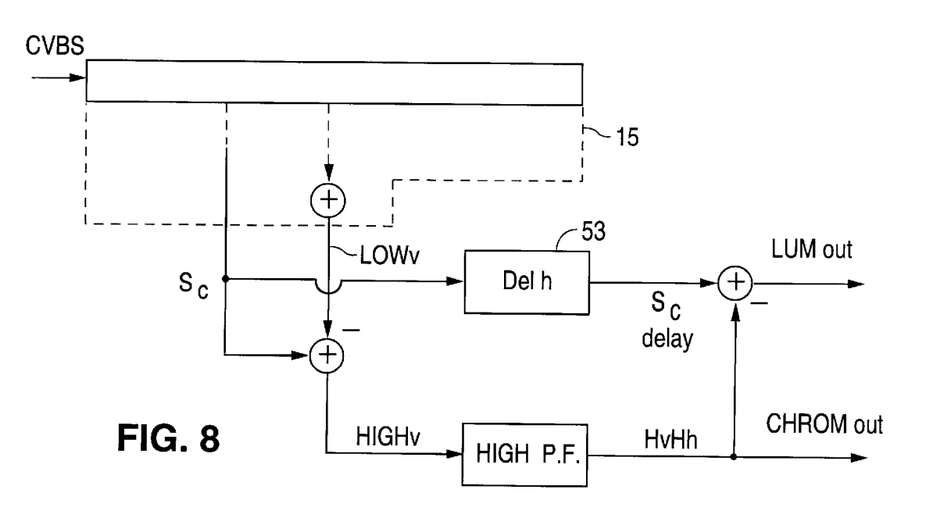
FIG. 8 is a block diagram of an alternate circuit or logic process for performing filtering according to an alternate embodiment of the invention.

FIG. 8 is a block diagram of another 2D filter according to an alternate embodiment of the invention. In FIG. 8, CVBS in enters a Low Pass Filter Structure 15a, which produces signal LOWv and center scan line signal $S_c$. Signal LOWv is removed from signal $S_c$ to produce HIGHv. HlGHv is then passed through a high pass filter that operates in the horizontal direction to produce a signal HvHh, which can be used as a CHROM out signal. This CHROM out signal is then removed from an aligned $S_c$ signal to produce LUM out.

The circuit of FIG. 8 performs a similar filter function taking advantage of alias signal as the circuit on FIG. 5, but in an alternate direction and thereby saves one delay line from the implementation of FIG. 5.

Composite Video Receiving Device

Figure 9:
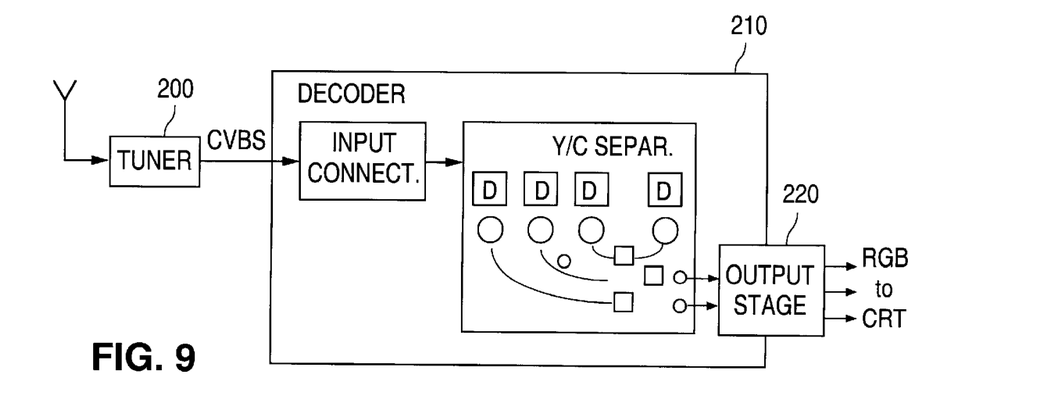
FIG. 9 shows a receiver according to an embodiment of the invention.

In one embodiment, the present invention comprises a video display device such as a TV, VCR player, or set-top decoder, with a color separator as described above. FIG. 9 is an illustrative block diagram of such a device, showing tuner 200 for receiving a broadcast signal and producing a video signal, decoder 210 with color separation as described above, and output stage 220 that converts the separated video signals to a format suitable for driving a display.

Embodiment in a Programmed Digital Apparatus

The invention may be embodied in a fixed media or transmissible program component containing logic instructions and/or data that cause an appropriately configured computer to perform signal filtering according to the invention.

Figure 10:
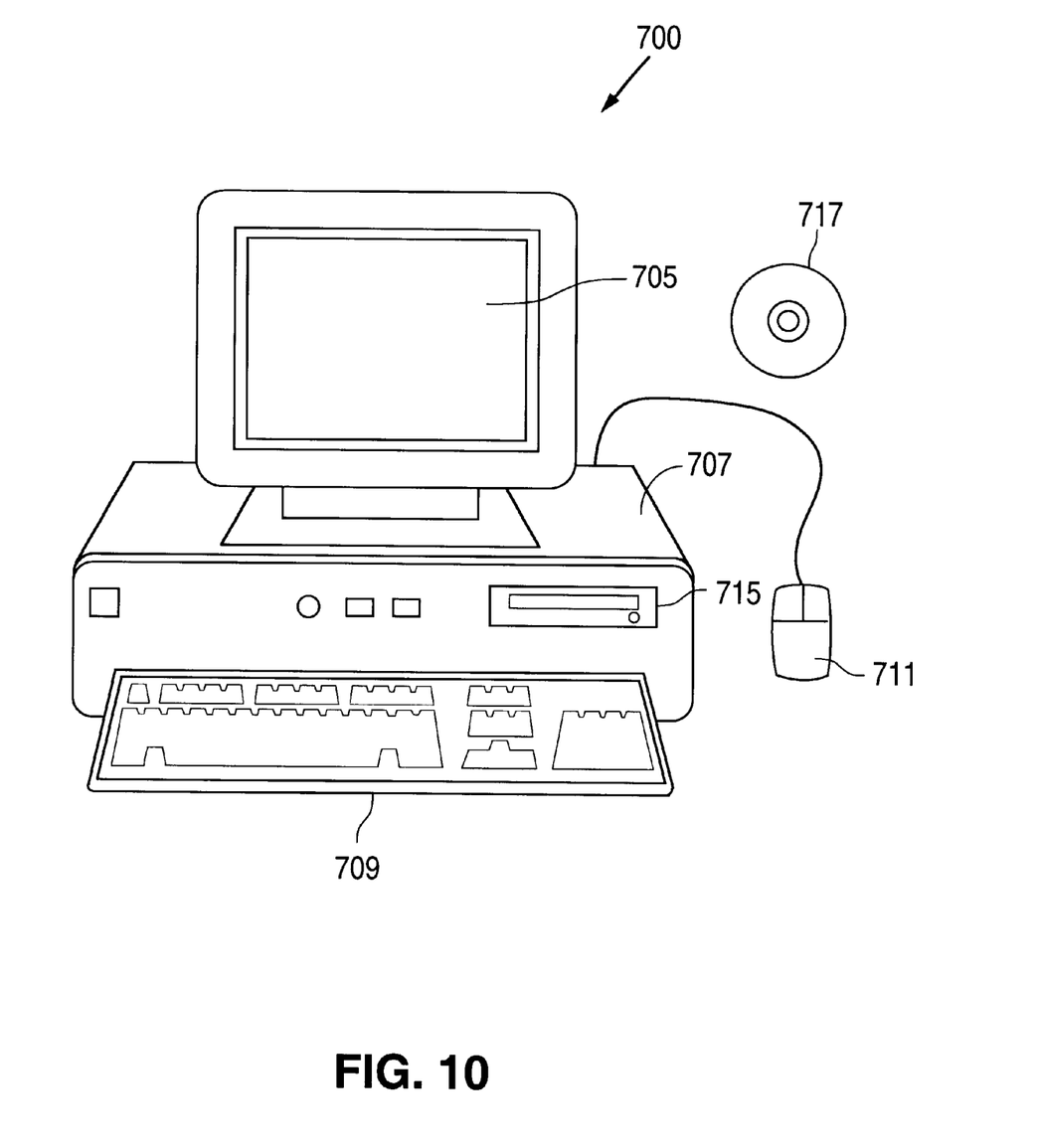
FIG. 10 shows a computing device according to an embodiment of the invention.

FIG. 10 shows digital device 700 that may be understood as a logical apparatus that can read instructions from media 717 and/or communication port 719. Apparatus 700 can thereafter use those instructions to direct a method of signal processing according to the invention. One type of logical apparatus that may embody the invention is a computer system as illustrated in 700, containing CPU 707, optional input devices 709 and 711, disk drives 715 and optional monitor 705. Fixed media 717 may be used to program such a system and could represent a disk-type optical or magnetic media or a memory. Fixed media 717 can also contain instructions for a computer or digital signal processor that embody the invention. Communication port 719 may also be used to program such a system and could represent any type of communication connection.

The invention also may be embodied within the circuitry of an application specific integrated circuit (ASIC) or a programmable logic device (PLD). In such a case, the invention may be embodied in a computer understandable descriptor language which may be used by a computing device such as 700 to create an ASIC or PLD that operates as herein described.

The invention also may be embodied within the circuitry or logic processes of other display apparatus, such as cameras, displays, image editing equipment, etc.

It should be understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method for separating a signal having frequency components in a first direction and a second direction comprising:
   receiving said signal through a first low pass filter in a first direction, said first low pass filter passing a low frequency component and an alias high frequency component as a first low pass filter output;
   generating a signal representing a complement of said first low pass filter output;
   filtering said complement in a second direction to produce a two-directional filtered signal; and
   using said two-directional filtered signal to produce a first separated output signal.

2. The method according to claim 1 wherein said receiving through a first low pass filter further comprises:
   receiving said signal through a plurality of delay stages to produce a plurality of parallel signals; and
   combining said plurality of parallel signals to produce said first low pass filter output.

3. The method according to claim 1 wherein said filtering of said complement is a high pass filtering.

4. The method according to claim 1 wherein said filtering of said complement is a low pass filtering.

5. The method according to claim 3 wherein said two-directional filtered signal provides a chrominance output from a composite video input.

6. The method according to claim 4 wherein said two-directional filtered signal is combined with said first low-pass filter output to produce luminance output from a composite video input.

7. A separator for separating a received signal comprising:
   a connection for accepting said received signal;
   a low pass filter in a first direction relative to said received signal to produce a first low pass filter output;
   a first combiner for producing a complement of said first low pass filter output;
   a filter for filtering said complement in a second direction to produce a two-directional filtered signal; and
   an output using said two-directional filtered signal to produce a first separated output signal.

8. The device according to claim 7 wherein said low pass filter comprises:
   a plurality of staged delay components with the output of a delay component operationally connected to the input of a next delay component, said delay components providing a plurality of staged signals; and
   a first combiner for joining outputs of said staged delay components into said low pass filter output.

9. The device according to claim 7 wherein said filtering of said complement is a high pass filtering.

10. The device according to claim 7 wherein said filtering of said complement is a low pass filtering.

11. The device according to claim 9 wherein said two-directional filtered signal provides a chrominance output from a color video composite input.

12. The device according to claim 10 wherein said two-directional filtered signal is combined with said low-pass filter output to produce luminance output from a color video composite input.

13. A video receiving apparatus comprising:
    an interface for receiving an input signal and outputting a composite video signal;
    a decoder comprising:
    a low pass filter in a vertical direction to produce a LOWv signal having a low frequency component and an alias component;
    a first combiner for removing said LOWv signal from a center input signal to produce a HIGHv signal;
    a filter for filtering said HIGHv in a horizontal direction to produce a two-directional filtered signal; and
    an output using said two-directional filtered signal to produce a first separated output signal.

14. The device according to claim 13 wherein said low pass filter comprises:
    a plurality of staged delay components with the output of a delay component operationally connected to the input of a next delay component, said delay components providing a plurality of staged signals;
    a plurality of adjusters for adjusting said staged signals by adjustment values; and
    a first combiner for joining outputs of said staged delay components and said adjusters into a LOWo signal.

15. The device according to claim 13 wherein said filtering of said complement is a high pass filtering.

16. The device according to claim 13 wherein said filtering of said complement is a low pass filtering.

17. The device according to claim 15 wherein
    said two-directional filtered signal provides a chrominance output from said color video composite input.

18. The device according to claim 16 wherein
    said two-directional filtered signal is combined with said low-pass filter output to produce luminance output from said color video composite input.

19. A method for separating a signal comprising:
    receiving said signal through a plurality of delay stages to produce a plurality of parallel signals, said plurality of parallel signals having data correlation in a parallel direction to a received direction and in an orthogonal direction to said received direction;
    combining said plurality of input signals to produce a LOWo signal, said LOWo signal including low frequency and an alias high frequency in said orthogonal direction;
    generating a HIGHo signal, said HIGHo signal representing a complement of said LOWo signal; processing said HIGHo signal through a low-pass filtering of the parallel component to produce a FHGHoLOWp signal;
    combining said HIGHoLOWp and said LOWo signals to produce a first component output signal.

20. The method according to claim 19 further comprising:
    subtracting said first component output signal from one of said input signals to produce a second component output signal.

21. The method according to claim 19 further comprising:
    adjusting a plurality of said input signals by adjustment values prior to combining said signals.

22. A method for separating a signal comprising:

receiving said signals through a plurality of delay stages to produce a plurality of parallel input signals, said plurality of parallel input signals having data correlation in a parallel direction to a received direction and in an orthogonal direction to said received direction;

combining said plurality of input signals to produce a LOWo signal;

generating a HIGHo signal by removing said LOWo signal from an input signal;

processing said HIGHo signal through a high-pass filtering of the parallel component to produce a HIGHo-HIGHp component and using said HIGHoHIGHp as a component output signal.

23. The method according to claim 22 further comprising:

removing said HIGHoHIGHp signal from an input signal to produce a second component output signal.

24. The method according to claim 22 further comprising:

multiplying said input signals each by a plurality of coefficients prior to combining said signals.

25. An apparatus for separating a received signal comprising:

an input connection for accepting an input signal;

a plurality of staged delay components with the output of a delay component operationally connected to the input of a next delay component, said delay components providing a plurality of staged signals;

a plurality of multipliers for multiplying said staged signals by coefficients;

a first combiner for joining outputs of said plurality of multipliers into a LOWo signal representing a frequency component orthogonal to an input direction and having a low frequency component and an alias high frequency component;

a second combiner for subtracting said LOWo signal from a central input signal, said second combiner operationally connected to a high-pass filter of the parallel component to produce a HIGHoHIGHp component, said component providing a first component output signal.

26. The separator of claim 7 wherein:

the first low pass filter output has a low frequency component and an alias high frequency component.

27. The method of claim 22 wherein:

the LOWo signal has a low frequency component and an alias high frequency component.

* * * * *